April 22, 1969   T. THORNE-THOMSEN   3,439,943
QUICK CONNECT-DISCONNECT COUPLING
Filed July 6, 1967

INVENTOR:
THOMAS THORNE-THOMSEN
BY
Henry W. Cummings
ATTORNEY

United States Patent Office 3,439,943
Patented Apr. 22, 1969

---

3,439,943
QUICK CONNECT-DISCONNECT COUPLING
Thomas Thorne-Thomsen, Godfrey, Ill., assignor to Olin Mathieson Chemical Corporation, a corporation of Virginia
Continuation-in-part of application Ser. No. 482,045, Aug. 24, 1965. This application July 6, 1967, Ser. No. 651,469
Int. Cl. F16l 37/12, 47/00
U.S. Cl. 285—316                                       1 Claim

ABSTRACT OF THE DISCLOSURE

A quick connect-disconnect coupling for use in connection with hoses, sprinklers and related articles. The male member of the coupling is sealingly secured to the female member by a snapring having an inwardly directed lobe. The lobe passes through an opening in a tubular adapter which is secured to the female member. The male and female members can be assembled or disassembled by axially moving the spring biased cap member, permitting the snapring to expand to a larger diameter, thus allowing the end of the male member to be inserted into or withdrawn from the adapter and female member.

---

This application is a continuation-in-part of U.S. application Ser. No. 482,045, filed Aug. 24, 1965, now U.S. Patent 3,352,576, issued Nov. 14, 1967.

The said U.S. Patent 3,352,576 provides for a coupling which may be quickly connected or disconnected without the turning of threaded members. Said application provides for interfitting male and female members held together by a locking means in which the two members become automatically locked together by a snap action merely upon introduction of the male member into the female member.

The present application likewise provides for a coupling which is quickly connected and disconnected without the turning of threaded members. It also provides for interfitting male and female members. However, the locking arrangement according to the present invention is simpler in construction and less expensive to manufacture than the locking means according to U.S. Patent 3,352,576.

Summary

A quick connect-disconnect coupling is provided comprising a male member, a female member, an adapter, a spring biasing means, a snapring, a cap, and a sealing means. The spring biasing means urges the cap into engagement with the adapter. The cap holds at least one snapring lobe in engagement with a groove on the male member. The male member when engaged urges the sealing means into tight engagement with the female member. The coupling can be engaged or disengaged by moving the cap against the bias of the spring, permitting the snapring to expand to a larger diameter, thus permitting the end of the male member to pass in and out of the quick connect.

It is an object of this invention to provide a coupling device which may be quickly connected and disconnected.

It is another object of this invention to provide a hose coupling device which may be quickly connected and disconnected.

It is another object of this invention to provide a coupling device which may be quickly connected and disconnected which is of simple construction and is inexpensive to manufacture.

Other objects will appear from the following description and drawings of the invention.

Figure 1:
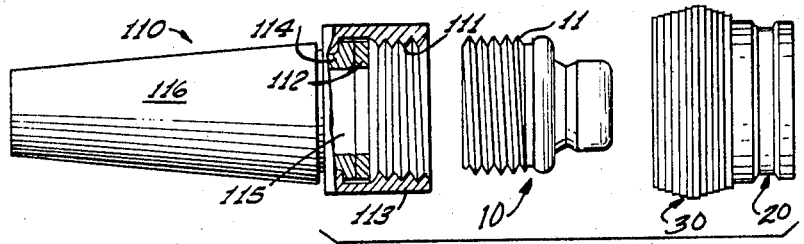
FIGURE 1 is an exploded view of the outside of the quick connect-disconnect coupling of the present invention and a spray nozzle which may be utilized with the quick connect-disconnect of the present invention.

As can be seen from FIGURE 1, the quick connect of the present invention comprises a male member 10, a female member 20, and a cap 30. As can be seen from FIGURE 2, there is also an adapter 40 which, as can be seen better from FIGURE 3, has a flange 47 and a plurality of openings 41 which are formed in a groove 42. There is a first step 43 and a second step 44 together with a portion of constant diameter 45.

Figure 2:
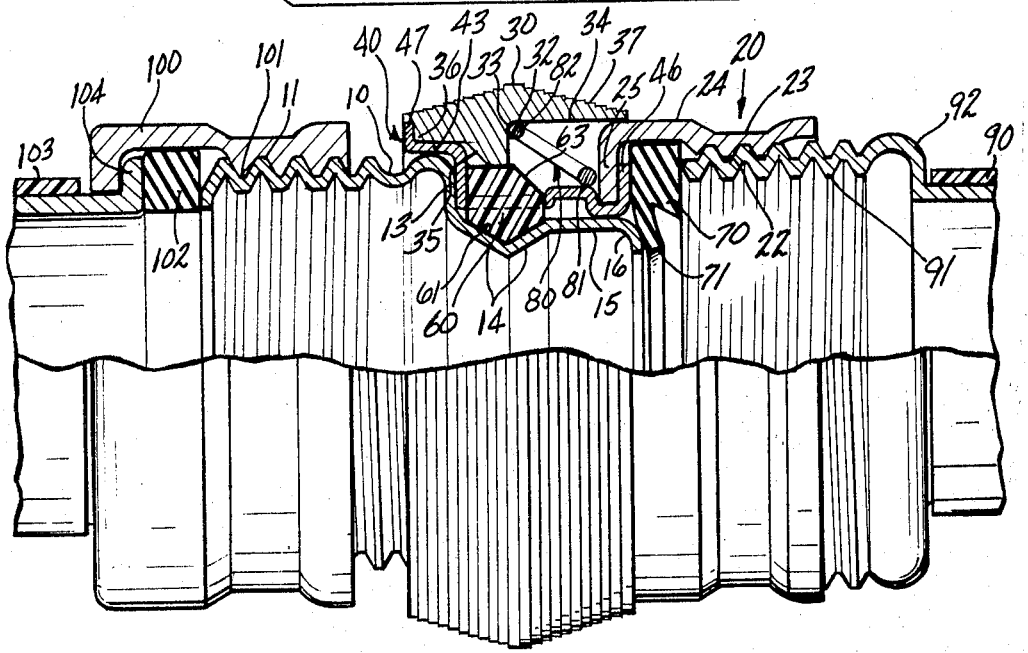
FIGURE 2 is a sectional view of the quick connect-disconnect coupling of the present invention.
Figure 3:
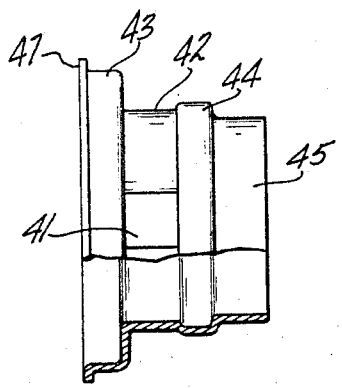
FIGURE 3 is a view of the adapter to be used in the quick connect of the present invention.
Figure 4:
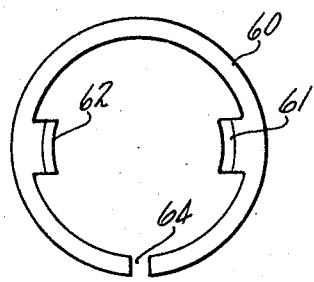
FIGURE 4 is a view of the snapring to be used in the present invention.

As can be seen in FIGURES 2 and 4, there is also a snapring 60 which has lobes 61 and 62. The number of these lobes will correspond to the number of openings 41 in the adapter 40 shown in FIGURE 3. The lobes 61 and 62 also have a slanting portion 63. The snapring 60 is of a diameter greater than that of the adapter groove 42 so that the lobes 61 and 62 can fit into the openings 41 of the adapter. There is also an expansion space 64 in the snapring. The snapring 60 having lobes 61 and 62 is fitted into the adapter as shown in FIGURE 2.

Returning to FIGURE 2, the male member 10 has external threads 11. It also has a portion of reduced cross section 13 and a groove 14. It has a portion of constant cross section 15 and an end portion 16.

The female member 20, which is also threaded internally at 22, has a groove 23 to aid in gripping. The female member also has a portion of constant diameter 24 and an end portion 25 of reduced cross section.

A sealing ring 70 is located inside the portion of constant cross section 24 between the internal threads 22 and the tab portion 46 of the adapter. The tab 71 of the sealing ring engages the end portion 16 of the male member when the male portion of the coupling is inserted.

As also can be seen in FIGURE 2, the plastic cap 30 is shaped at 36 so as to engage the flange 47 and the first step 43 of the adapter. It also has a slanting portion 35 and a portion of small diameter 32 adapted to engage the snapring 50, a curved step 33, and a portion of constant diameter 34. The outer surface 37 of the cap also has small steps to aid in gripping the cap.

A biasing means such as spring 80 is inserted in which one coil 81 engages the adapter at the second step thereof 44 and also engages the end portion 25 of the female member. The other coil 82 engages the curved step portion 33 of the cap, thus holding the cap in engagement with the adapter flange 47.

By way of example only, in FIGURE 2 the female member is shown threadably engaged to standard male coupling 92 of hose 90 by means of threads 91, while the male member is shown threadably engaged to a standard female hose coupling 100 by means of threads 101. The threads 11 also engage seal 102 which is found in conventional female hose couplings. The hose 103 has a flange portion 104 which engages the seal 102 on the other side.

In FIGURE 1, the male member 10 may be connected to a nozzle 110 by screwing the threads 11 into the internal threads 111 formed in the connector section 113 of the nozzle. When so engaged, the threads 111 will engage a seal 112. The internal member 114 defines an opening 115 through which the water or other liquid passes into the nozzle body 116. The details of the nozzle body 116 are not shown, as these are conventional in the art and form no part of the present invention.

The quick connect is assembled in the following manner. The snapring 60 is first placed in the groove 42 of the adapter with the lobes 61 and 62 passing through the openings 41 in the adapter. The female member is then placed upon the portion of constant diameter 45 of the adapter adjacent step 44. The remaining portion 45 of the adapter shown in FIGURE 3 is bent by a forming tool around the end portion 25 of the female member forming the tab portion 46 shown in FIGURE 2. Next the seal 70 is placed inside the portion of constant cross section 24 of the female member adjacent the tab 46. Next the biasing means 80 is placed with one coil 81 in engagement with the adapter step 44 and the edge portion 25 of the female member. The cap 30 is then placed in engagement with the adapter flange 47 and the first step of the adapter 43, with the second spring coil 82 in engagement with the curved step 33 of the cap. It is necessary to counteract the biasing of the spring 80 to so engage the cap 30.

In FIGURE 2, the male member 10 is shown inserted into the quick connector. However, it would not be possible to insert the male member if the adapter, snapring, cap and female member were positioned as they are shown in FIGURE 2. If an attempt was made to introduce the male member, the end portion 16 and the portion of constant cross section 15 thereof would come into contact with the snapring lobes 61 and 62. The snapring 60 is held firmly in position by the cap 30 and the spring 80. There is no way for the snapring to expand and permit the male member to enter.

However, if the cap 30 is gripped by the operator and moved to the right along the constant diameter portion 24 of the female member against the bias of the spring 80, it is apparent that the lobes 61 and 62 will no longer be confined by the portion 32 of the cap. Thus, if after moving the cap 30 to the right with the fingers, the male member is then inserted, it will again contact the snapring lobes 61 and 62. However, in this case, the snapring 60 can expand with the slanting portion 63 of the lobes moving along the slanting portion 35 of the cap to the diameter of the cap at 36.

While the snapring 60 remains expanded to the cap diameter at 36, the end portion 16 and the portion of constant cross section 15 of the male member will slide along the lobes 61 and 62 until the groove 14 of the male member is reached. At this point, the lobes 61 and 62 will engage the groove 14, and because of the reduced diameter of groove 14, the snapring will "snap back" to its original diameter as shown in FIGURE 2. The cap 30 is then released and it will move toward to the left in FIGURE 2 and the portion 32 thereof will again engage the snapring 60 to prevent expansion thereof, thus holding the lobes 61 and 62 in engagement with the groove 14 and preventing escape of the male member.

It will be seen in FIGURE 2 that when the male member is inserted, the end portion 16 thereof engages the sealing ring tab 71, thus urging the seal 70 against the threads 22 of the female member to insure an effective seal.

If it is desired to unhook the quick connect, it will be seen that if one merely pulls on the male member, the cap 30 will keep the lobes 61 and 62 in engagement with the groove 14 and it is not possible to disconnect the quick connect. However, if the cap 30 is moved to the right by the operator and then one pulls to the left on the male member 10, the male member will move the slant portion 63 of the lobes 61 and 62 along the slant portion 35 of the cap up to the larger diameter 36 of the cap and constant cross section portion 15 and the end portion 16 of the male member can move out.

The sealing member 70 is preferably made of such materials as neoprene or polyvinyl chloride or other rubbers, either natural or synthetic, and related materials known to those skilled in the art as effective sealing agents. The snapring 60 may be made of metal, if desired, but is preferably made of resilient plastic. The male and female members, and the adapter, could be made of plastic, if desired, but are preferably made of metal, particularly aluminum or copper alloys, such as brass. The cap also may be made of metal, but is preferably made of a plastic for reasons of economics. The spring 80 for biasing can be made from any of the corrosion resistant materials known to those skilled in the art for providing spring biasing, examples including stainless spring steel and corrosion resistant, high-strength bronzes.

It will be apparent that the foregoing differs from the previously mentioned U.S. Patent 3,352,576 in that the cap member 30 according to the present application is much simpler. A comparison of FIGURE 1 of said U.S. Patent 3,352,576 shows that this shell member 30 is more complicated in that it is necessary to have careful forming on both sides of the groove 34 because the locking member 40 must move along the left-hand side of this member when the male member is inserted and must also move along the righthand side when the male member is withdrawn. In contrast to this, according to the present invention, in both cases the snapring 60 moves only on one side of the groove. Furthermore, the female member in U.S. Patent 3,352,576 is considerably complex and requires more extensive forming. Thus, the forming required in U.S. Patent 3,352,576 results in substantial fabricating costs. In contrast to this, according to the present invention, the fabrication cost is materially reduced due to the simplified construction, resulting in a considerably lower selling price.

Additionally, the quick connect of the present invention is smaller and this results in a saving of material costs.

It is also to be emphasized that the two quick connects are operated in a different way. In the quick connect according to U.S. Patent 3,352,576, the male member can be inserted without moving the shell. However, according to the present invention, it is necessary to move the cap in a direction opposite to the spring bias. However, the substantial reduction in the fabrication cost and lower selling price of the article more than makes up for this difference in operation.

While the quick connect-disconnect of the present invention has been illustrated as connecting one hose portion to another hose portion, it is to be understood that the male member and/or the female member could be connected to other articles, such as sprinklers, nozzles, and carwash brushes, as well. In general, one member of the quick connect would be connected to these articles, and the other to the hose.

It is also to be emphasized that the quick connect-disconnect may be used not only in the garden hose field, but in all kinds of hoses and fluid handling equipment where it is necessary or desirable to quickly connect and disconnect operative members. Some fluid handling applications may dictate the use of materials which are known by those skilled in the art to be resistant to certain atmospheres, such as applications involving the handling of chlorine gas. However, those skilled in the art utilizing the mechanical construction of the present invention can readily choose appropriate materials which are resistant to the particular atmospheres and environments in which the quick connect-disconnect is to be used.

It is to be understood that the invention is not limited to the illustrations described and shown herein, which are deemed to be merely illustrative of the best modes of carrying out the invention, and which are susceptible of modifications of form, size, arrangement of parts and detail of operation. The invention rather is intended to encompass all such modifications which are within the spirit and scope of the invention.

What is claimed is:

1. A quick connect-disconnect coupling comprising: a male member having a groove and an end portion; a female member having a portion of constant diameter and a flanged end portion; an adapter having a flange which engages the flanged end portion of the female member and which surrounds and engages said male member, said adapter also having at least one opening; a snapring having at least one lobe adapted to pass through at least one of the openings in said adapter and engage the groove on said male member; a cap having a portion of reduced diameter adapted to engage said snapring; said cap also having a flange portion which engages said adapter and a portion of enlarged diameter; sealing means which engage said female member and the end portion of said male member when said male member is inserted into the quick connect; and spring biasing means urging said cap into engagement with said snapring and said adapter whereby said cap will maintain said snapring in engagement with the groove in said male member, but when said cap is moved in a direction opposite to the force of said spring biasing means, such movement providing sliding engagement on the portion of constant diameter of the female member, said snapring is free to expand to the said portion of a larger diameter on said cap, thus permitting said male member to be inserted and withdrawn from said quick connect.

References Cited

UNITED STATES PATENTS

| | | | |
|---|---|---|---|
| 1,509,651 | 9/1924 | Iftiger | 285—315 |
| 2,077,869 | 4/1937 | Bennett | 285—174 X |
| 2,490,363 | 12/1949 | Lang | 285—315 |
| 2,503,495 | 4/1950 | Koester | 285—277 X |
| 2,565,572 | 8/1951 | Pangborn | 285—316 X |
| 2,744,770 | 5/1956 | Davidson et al. | 285—316 |
| 2,950,132 | 8/1960 | Kocsuta | 285—321 X |
| 3,196,897 | 7/1965 | Hodson | 285—316 X |
| 3,352,576 | 11/1967 | Thorne-Thomsen | 285—316 X |

THOMAS F. CALLAGHAN, *Primary Examiner.*

U.S. Cl. X.R.

285—174, 321